US008397361B1

(12) United States Patent
Irving

(10) Patent No.: US 8,397,361 B1
(45) Date of Patent: Mar. 19, 2013

(54) MOTORCYCLE VALVE SPRING REMOVAL TOOL

(76) Inventor: David K. Irving, Hyrum, UT (US)

( * ) Notice: Subject to any disclaimer, the term of this patent is extended or adjusted under 35 U.S.C. 154(b) by 0 days.

(21) Appl. No.: 13/179,024

(22) Filed: Jul. 8, 2011

Related U.S. Application Data

(62) Division of application No. 11/740,127, filed on Apr. 25, 2007, now Pat. No. 7,975,357.

(51) Int. Cl.
*B23P 19/04* (2006.01)
*B25B 27/26* (2006.01)

(52) U.S. Cl. ........................... 29/217; 219/215; 219/216

(58) Field of Classification Search .................... 29/217, 29/216, 213, 215, 219, 220
See application file for complete search history.

(56) References Cited

U.S. PATENT DOCUMENTS

| | | | | |
|---|---|---|---|---|
| 1,685,548 | A | 9/1928 | Housley et al. | |
| 2,213,102 | A * | 8/1940 | Crook et al. | 29/216 |
| 3,352,002 | A | 11/1967 | Kryk | |
| 3,977,064 | A | 8/1976 | Mote et al. | |
| 4,009,867 | A | 3/1977 | Diffenderfer | |
| 4,780,941 | A | 11/1988 | Tucker | |
| 4,912,825 | A | 4/1990 | Policella | |
| 5,042,128 | A | 8/1991 | Barbour | |
| 5,241,734 | A | 9/1993 | Brackett | |
| 5,339,515 | A | 8/1994 | Brackett et al. | |
| 5,371,932 | A | 12/1994 | Bryan et al. | |
| 5,689,870 | A * | 11/1997 | Robey | 29/217 |
| 5,950,293 | A | 9/1999 | Hamilton et al. | |
| 5,966,788 | A | 10/1999 | Klann | |
| 6,634,330 | B2 | 10/2003 | Matsuda et al. | |
| 6,904,885 | B2 | 6/2005 | Osband | |
| 6,938,315 | B2 | 9/2005 | Alanis | |
| 7,181,818 | B1 | 2/2007 | Qualman et al. | |
| 2005/0076486 | A1 | 4/2005 | Alanis | |

FOREIGN PATENT DOCUMENTS

| | | |
|---|---|---|
| GB | 2324263 | 10/1998 |

* cited by examiner

*Primary Examiner* — Lee D Wilson
*Assistant Examiner* — Alvin Grant
(74) *Attorney, Agent, or Firm* — Hall Estill Attorneys at Law; Daniel P. Dooley

(57) ABSTRACT

Preferably, a motorcycle valve spring removal tool includes a motorcycle engine operatively mounted and secured to a frame of a motorcycle, and a valve spring compression tool secured to the motorcycle engine for use in removing a valve spring of the motorcycle engine while the cylinder head remains torqued to the cylinder, and the motorcycle engine remains mounted and secured within the motorcycle frame. In a preferred embodiment, the valve spring compression tool includes a base plate supporting a stud reception member that provides a threaded stud attachment aperture, in which a corresponding threaded stud is secured. Also included in the preferred embodiment is a compression plate interacting with the threaded stud and a force transfer component, preferably a threaded nut, also interacting with the stud to impart a compression force on the valve spring to achieve a predetermined level of compression of the valve spring.

9 Claims, 6 Drawing Sheets

MOTORCYCLE VALVE SPRING REMOVAL TOOL

RELATED APPLICATION

This application is a divisional of U.S. patent application Ser. No. 11/740,127 filed Apr. 25, 2007, entitled "Motorcycle Valve Spring Removal Tool."

FIELD OF THE INVENTION

The claimed invention relates generally to the field of motorcycle mechanics particularly, but not by way of limitation, to a method and apparatus for removal of valve springs from a motorcycle engine.

BACKGROUND OF THE INVENTION

The present invention relates to an improved apparatus and method for removal of valve springs from a cylinder head of a motorcycle engine, while the engine remains mounted to the frame of a motorcycle, and the cylinder head remains torqued onto a cylinder of the motorcycle engine.

As the popularity of motorcycling and motorcycle ownership has increased over time, owners of motorcycles, particularly owners of motorcycles powered by "V-Twin" engines, such as those produced by Harley-Davidson®, have become interested in improving the performance of their machines. In response to this market demand for improved performance, performance packages, such as the "Screamin' Eagle®" performance package upgrade by Harley-Davidson®, is gaining acceptance.

Performance packages often include high performance cams and stiffer valve springs, which necessitates removal of the stock valve springs that are replaced by the stiffer springs provided by the kit. A difficulty encountered in adapting performance packages to existing motorcycles is often the need to remove the cylinder heads from the cylinders, and at times the need to remove the cylinders from the lower end to access the valve springs. For nearly all "V-Twin" configured motorcycles, removal of valve springs necessitates removal of the cylinder heads, and once the cylinders are removed, gaskets need to be replaced and the heads re-torqued.

With increased demands from the market being brought to bear on installers to lower the cost for the installation of motorcycle performance improvement packages, there is a continuing need to reduce the installation time for installing motorcycle performance improvement packages, and it is to this need that the present invention is preferably directed.

SUMMARY OF THE INVENTION

In accordance with preferred embodiments, a motorcycle valve spring removal tool is provided that incorporates a motorcycle engine operatively mounted and secured to a frame of a motorcycle, and a valve spring compression tool secured to the motorcycle engine for use in removing a valve spring of the motorcycle engine while the motorcycle engine remains mounted and secured within the motorcycle frame. Preferably, the valve spring compression tool includes a base plate supporting a stud reception member, in which a stud is secured. Also included in the preferred embodiment is a compression plate interacting with the stud and a force transfer component also interacting with the stud to impart a compression force on the valve spring to achieve a predetermined level of compression of the valve spring.

In an alternate preferred embodiment, a method of removing a valve spring includes the steps of, removing a valve cover from a cylinder head of a motorcycle engine while the engine remains securely mounted within the engine's corresponding motorcycle frame, and securing a valve spring compression tool to the cylinder head. The method preferably further includes, activating the valve spring compression tool to compress a valve spring of the cylinder head, and removing a valve spring retention component from a valve stem of a valve associated with the valve spring of the cylinder head.

These and various other features and advantages that characterize the claimed invention will be apparent upon reading the following detailed description and upon review of the associated drawings.

DETAILED DESCRIPTION OF THE PREFERRED EMBODIMENTS

Reference will now be made in detail to one or more examples of the invention depicted in the accompanying figures. Each example is provided by way of explanation of the invention, and is not meant as, nor do they represent, limitations of the invention. For example, features illustrated or described as part of one embodiment may be used with another embodiment to yield still a different embodiment. Other modifications and variations to the described embodiments are also contemplated and lie within the scope and spirit of the invention.

Figure 1:
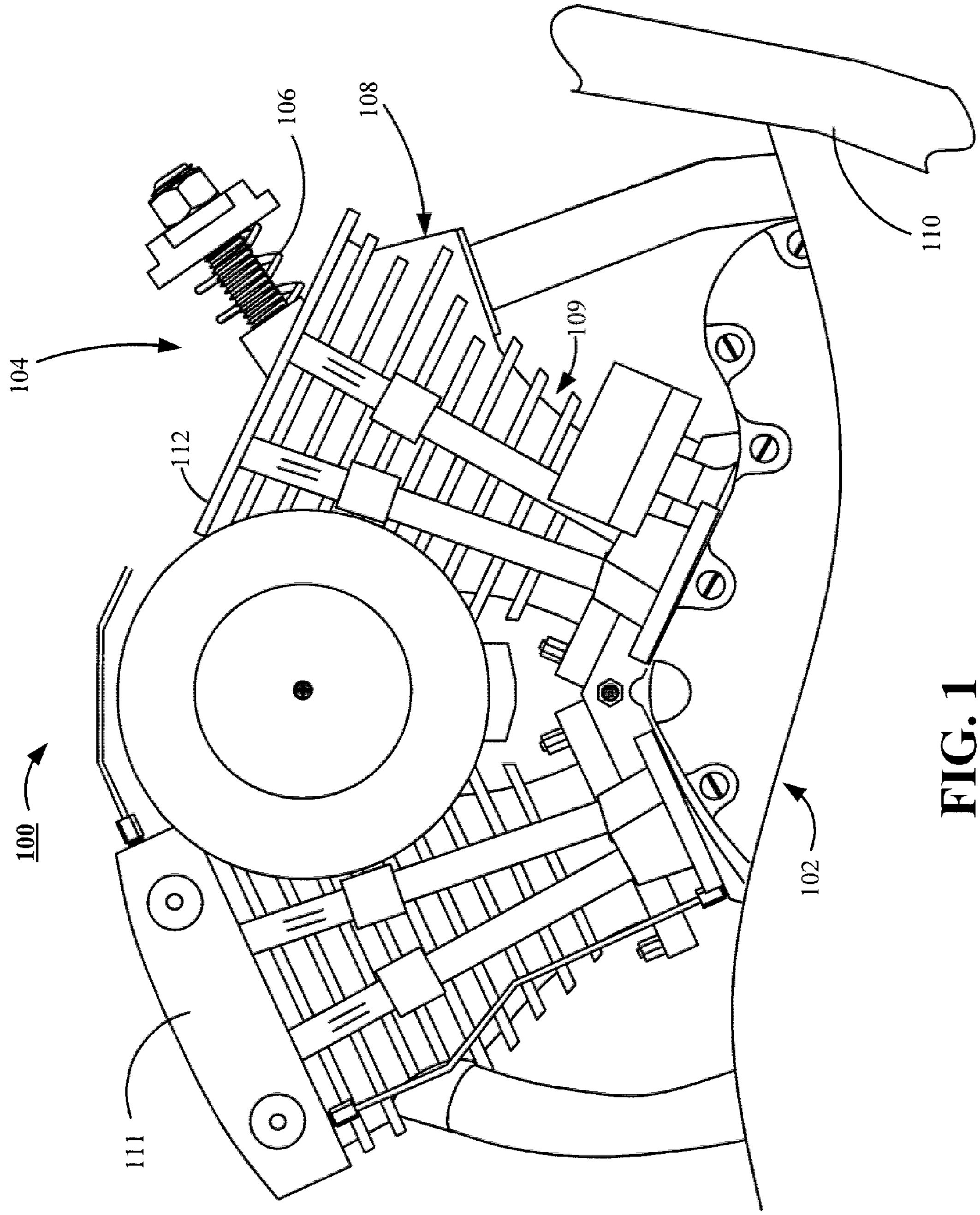
FIG. 1 is a partial cut-away, front elevation view of a preferred embodiment of the present valve spring removal tool invention.

To provide an enhanced understanding of the present invention, while reading this descriptive portion of the specification a reader is encouraged to relate back to the figures that accompany this descriptive portion of the specification and associate the sign numbers provided by the following description with the sign number identified by the figures. FIG. 1 depicts a preferred embodiment of the present motorcycle valve spring removal tool 100 ("removal tool 100").

Removal tool 100 preferably incorporates the use of a motorcycle engine 102 coupled with a valve spring compression tool 104 ("compression tool 104") for use in removing a valve spring 106 from a cylinder head, such as 108, of the motorcycle engine 102. An advantage of this configuration is an ability to remove the valve springs of a cylinder head while the cylinder head 108 remains torqued to a cylinder 109, and the motorcycle engine remains mounted and secured within a motorcycle frame 110 (shown in partial cut-away). Prior to securement of the compression tool 104 to the cylinder head 108, a valve cover, such as 111, is removed from the cylinder head 108.

Figure 2:
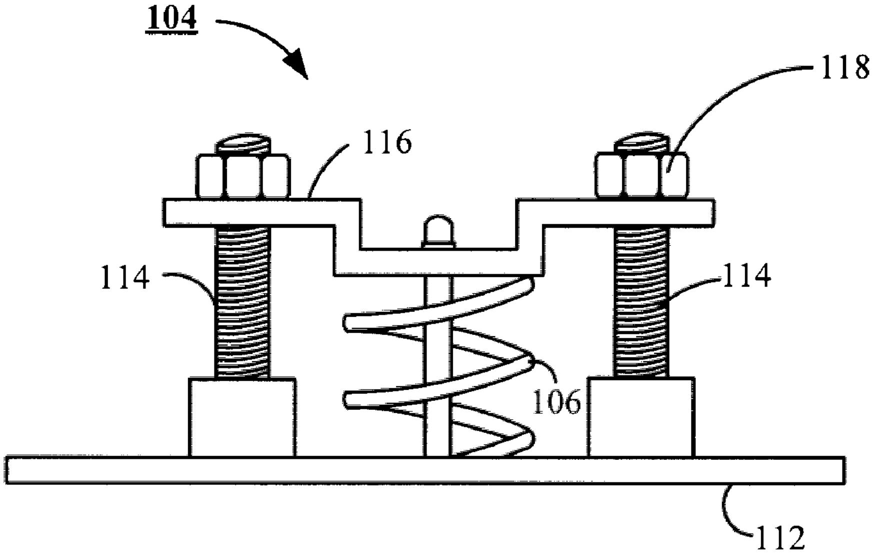
FIG. 2 provides a front elevation view of the valve spring compression tool of FIG. 1, showing a valve spring in an uncompressed form.

FIG. 2 illustrates the compression tool 104, which includes a base plate 112 (also referred to herein as a rigid support member 112) that supports the stud 114, which in a preferred embodiment is a threaded stud 114. FIG. 2 further illustrates that the compression tool 104 includes a compression plate 116, which interacts in sliding engagement with the stud 114 and rests upon the valve spring 106. Preferably, a pair of force transfer components 118 (which in a preferred embodiment are threaded nuts 118 that interact with the threaded stud 114) engage the stud 114 and impart a load force on the compression plate 116 when the force transfer components 118 are activated in a direction which facilitates compression of the valve spring 106 as shown by FIG. 3.

Figure 3:
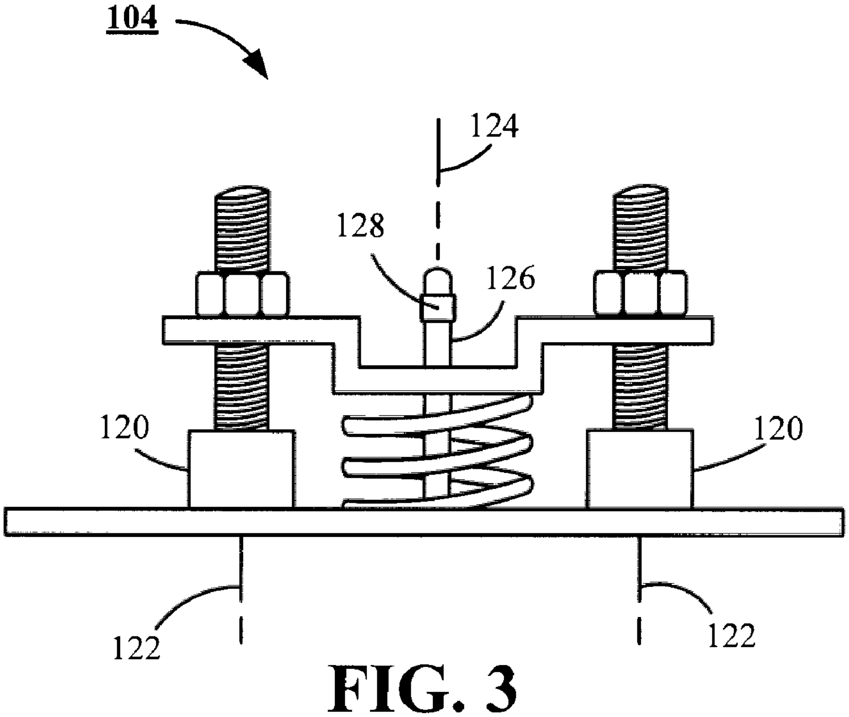
FIG. 3 shows a front elevation view of the valve spring compression tool of FIG. 1, showing a valve spring in a compressed form.

FIG. 3 additionally shows the compression tool 104 preferably further includes a stud reception member 120 secured to the base plate 112 such that a centerline 122 of the stud reception member 120 and a centerline 124 of a valve stem 126 associated with the valve spring 106, are each substantially parallel to the other. To be noted that within the valve spring 106 is in its compressed form, a valve spring retention component 128 is accessible for removal, which when removed, promotes the removal of the valve spring 106 from the cylinder head 108 (of FIG. 1).

Figure 4:
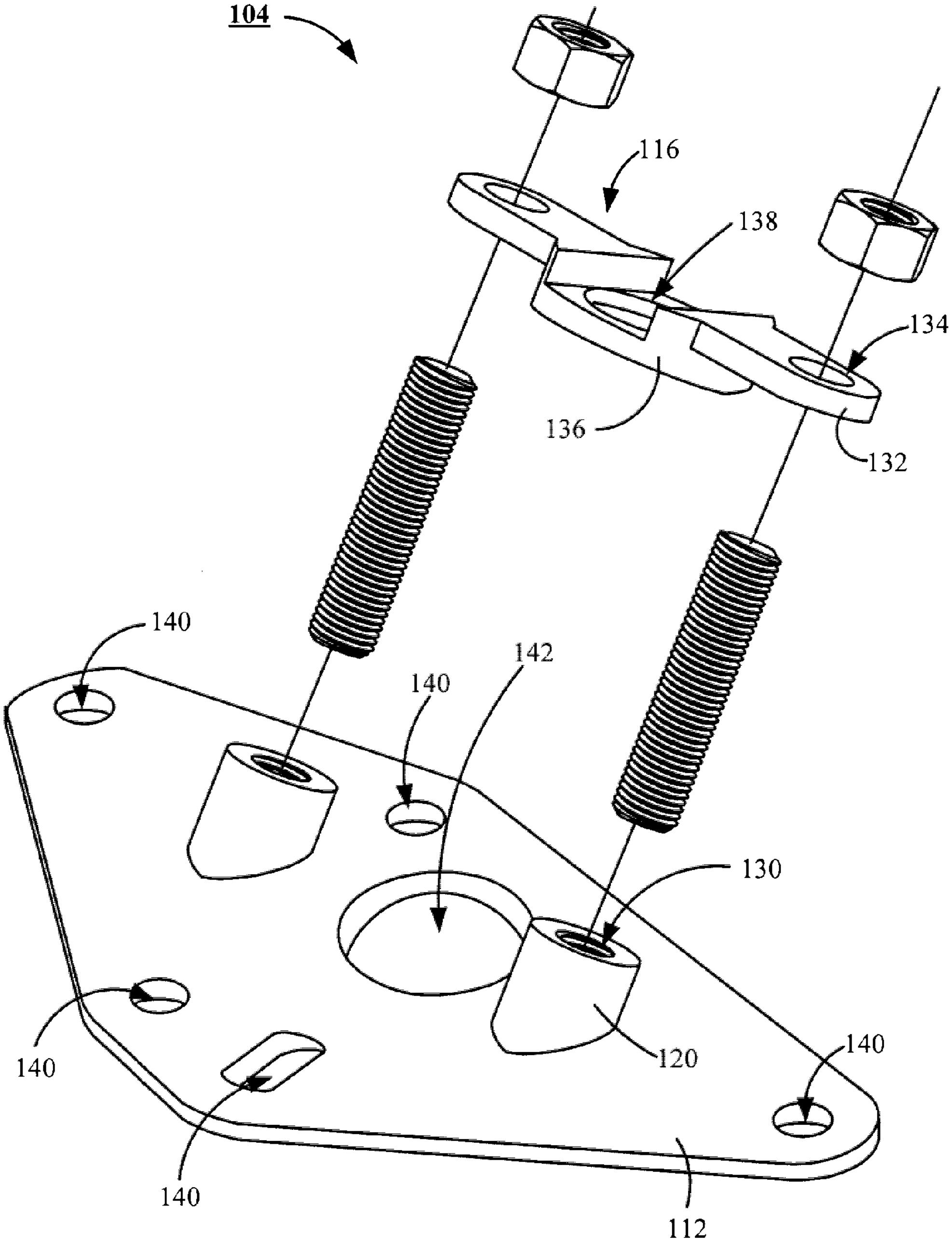
FIG. 4 illustrates a back exploded perspective view of the valve spring compression tool of FIG. 1.

Turning to FIG. 4, it will be noted that in a preferred embodiment, the stud reception member 120 provides an attachment aperture 130, which is threaded for engagement and interaction with the threaded stud 114. The compression plate 116 preferably includes a stud confinement member 132, which provides a stud retention aperture 134 configured for interaction with the threaded stud 114. FIG. 4 further shows the compression plate 116 preferably provides a valve spring interaction member 136 adjacent the stud confinement member 132. The valve spring interaction member 136 preferably interacts directly with the valve spring 106 (of FIG. 2) during compression and decompression of the valve spring 106, and a valve stem aperture 138 of the valve spring interaction member 136 provides clearance for the valve stem 126 (of FIG. 3) during the compression of the valve spring 106. FIG. 4 also shows that the base plate 112 provides a plurality of mounting apertures 140, for use in securing the compression tool 104 to the cylinder head 108 (of FIG. 1), and a valve spring clearance aperture 142 to facilitate placement of the compression tool 104 upon the cylinder head 108.

Figure 5:
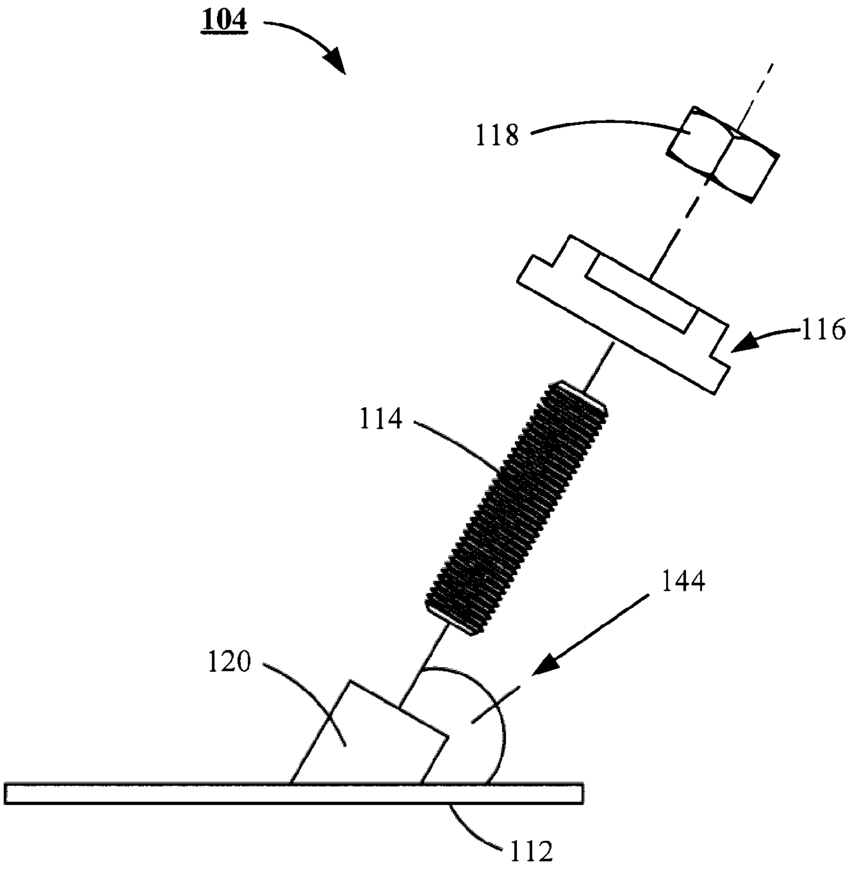
FIG. 5 depicts a side exploded elevation view of the valve spring compression tool of FIG. 1.

In a preferred embodiment, as depicted by FIG. 5, the stud reception member 120 is fastened to the base plate 112 at a predetermined angle 144, which is determined by the angle of attack of the valve spring 106 (of FIG. 1) relative to its corresponding cylinder head 108. Accordingly, in a preferred embodiment, the final configuration of the compression tool 104 is determined by the model of engine utilized by a motorcycle of interest.

Figure 6:
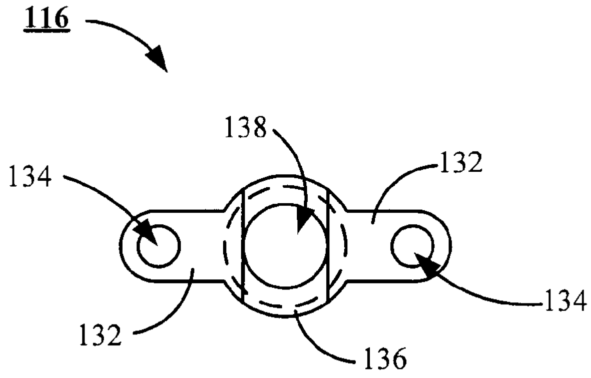
FIG. 6 presents a top plan view, including hidden lines of a compression plate of the valve spring compression tool of FIG. 1.

FIG. 6 provides a more clear representation of the compression plate 116 relative to a layout of the preferred embodiment of the compression plate 116. In a preferred embodiment, the compression plate 116 provides a pair of stud confinement members 132 each providing a stud retention aperture 134. FIG. 6 further shows the valve spring interaction member 136 is preferably disposed between the pair of stud confinement members 132 and presents the valve stem aperture 138 in line with the pair of stud retention apertures 134.

Figure 7:
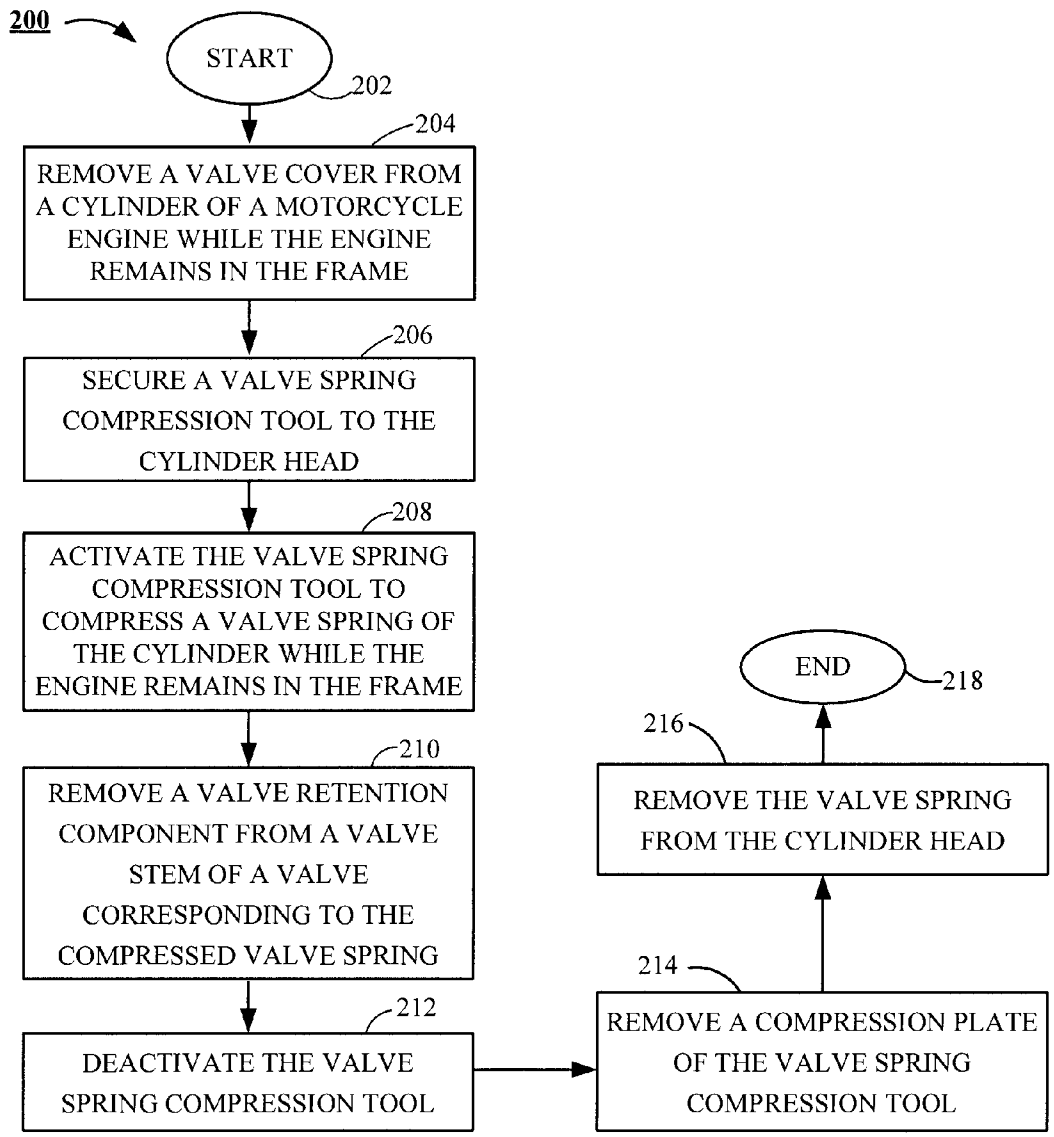
FIG. 7 is a diagram of a flowchart of a method of using the present invention.

FIG. 7 shows method steps of a process 200 of using an inventive motorcycle valve spring removal tool (such as 100). The process commences at start step 202 and continues at process step 204. At process step 204, a valve cover (such as 111) is removed from a cylinder head (such as 108) of a motorcycle engine (such as 102), while the motorcycle engine remains securely mounted within its corresponding motorcycle frame (such as 110). At process step 206, a valve spring compression tool (such as 104) is secured to the cylinder head. At process step 208, the valve spring compression tool is activated to compress a valve spring (such as 106) of the cylinder head. At process step 210, a valve spring retention component (such as 128) is removed from a valve stem (such as 126) associated with the valve spring.

Continuing with the process at process step 212, with the valve spring retention component removed from the valve stem, the valve spring compression tool is deactivated, and the compression plate is removed from the valve spring compression tool at process step 214. At process step 216, the valve spring is removed from the cylinder head and the process concludes at end process step 218.

Figure 8:
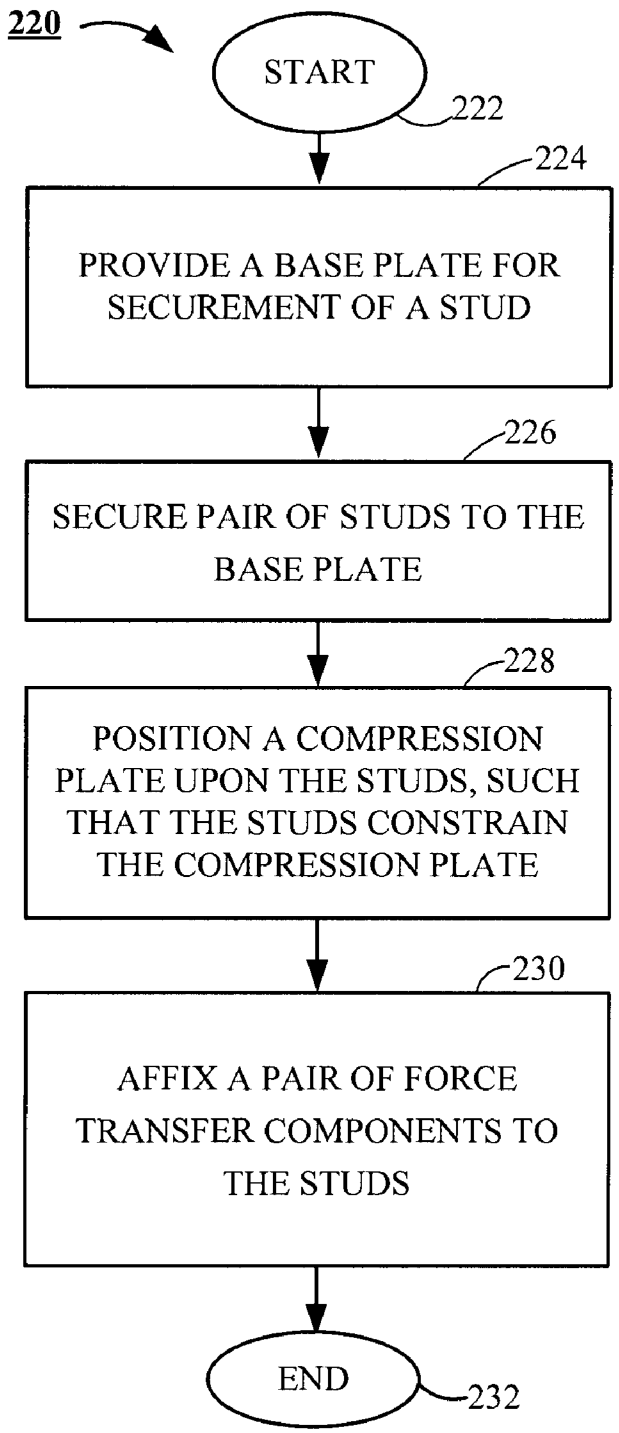
FIG. 8 is a diagram of a flowchart of a method of assembling the present invention.

FIG. 8 shows method steps of a process 220 of using an inventive motorcycle valve spring removal tool (such as 100). The process commences at start process step 222 and continues at process step 224. A base plate (such as 112) is provided at process step 224. At process step 226, preferably a pair of studs (such as 114), are secured to the base plate, and a compression plate (such as 116) is positioned upon and constrained by the studs at process step 228. At process step 230, a pair of force transfer components (such as 118), are preferably affixed to the pair of studs for interacting with the compression plate. The force transfer components impart a compressive force on the valve spring to compress said valve, and the process concludes at end process step 232.

It is to be understood that even though numerous characteristics and advantages of various embodiments of the present invention have been set forth in the foregoing description, together with details of the structure and function thereof, this detailed description is illustrative only, and changes may be made in detail, especially in matters of structure and arrangement of parts within the principles of the invention to the full extent indicated by the broad general meaning of the terms in which the appended claims are expressed. For example, the particular elements may vary depending on the particular application for a select engine, while maintaining the same functionality without departing from the spirit and scope of the invention.

What is claimed is:

1. A motorcycle valve spring removal tool comprising:

a valve spring compression tool secured to a motorcycle engine for use in removing a valve spring of said motorcycle engine while said motorcycle engine with its associated torqued down cylinder head remains mounted and secured within a frame of the motorcycle, in which said valve spring compression tool provides a rigid support member secured to and in direct pressing contact with an external surface of a cylinder head of the torqued down cylinder head, and a non-rotating compression plate cooperating with a plurality of studs extending from the rigid support member to facilitate removal of said valve spring.

2. The motorcycle valve spring removal tool of claim 1, in which each stud of the plurality of studs is secured to said rigid support member and for determining a level of compression of the valve spring.

3. The motorcycle valve spring removal tool of claim 2, in which said valve spring compression tool further comprises a force transfer component independent from and interacting with each stud to impart a compression force on the valve spring to achieve said level of compression of the valve spring.

4. The motorcycle valve spring removal tool of claim 3, in which said valve spring compression tool further comprises the non-rotating compression plate interacting with each stud, responsive to said force transfer component, and disposed between the valve spring and said force transfer component.

5. The motorcycle valve spring removal tool of claim 4, in which said valve spring compression tool further comprises a stud reception member secured to said rigid support member, wherein a centerline of said stud reception member is substantially parallel with a centerline of a valve stem associated with the valve spring when said non-rotating compression plate interacts with the valve spring.

6. The motorcycle valve spring removal tool of claim 5, in which said stud reception member comprises a stud attachment aperture for attachment of one of the plurality of studs to said rigid support member.

7. The motorcycle valve spring removal tool of claim 6, in which each stud is a threaded stud, and said stud attachment aperture is a threaded stud attachment aperture configured for interaction with said threaded stud.

8. The motorcycle valve spring removal tool of claim 7, in which said compression plate comprises:

a stud confinement member providing a stud retention aperture, said stud retention aperture configured for sliding interaction with said stud;

a valve spring interaction member adjacent said stud confinement member, said valve spring interaction member configured for operative interaction with the valve spring; and a valve stem aperture provided by the valve spring interaction member to accommodate penetration of the valve stem through the valve spring interaction member.

9. The motorcycle valve spring removal tool of claim 8, in which said rigid support member provides a mounting aperture for securement of said rigid support member in direct pressing contact with said cylinder head, and a valve spring clearance aperture adjacent said mounting aperture configured to accommodate protrusion of the valve stem associated with the valve spring.

* * * * *